United States Patent [19]

Minami et al.

[11] Patent Number: 4,864,125
[45] Date of Patent: Sep. 5, 1989

[54] EXTRA MAGNETIC FIELD POSITIONING APPARATUS

[75] Inventors: Hisashi Minami, Kaizuka; Toshihisa Deguchi, Nara; Masaru Nomura, Tenri; Takao Hyuga, Kyoto, all of Japan

[73] Assignee: Sharp Kabushiki Kaisha, Osaka, Japan

[21] Appl. No.: 104,968

[22] Filed: Oct. 6, 1987
(Under 37 CFR 1.47)

[30] Foreign Application Priority Data

Oct. 6, 1986 [JP] Japan ................. 61-237385

[51] Int. Cl.4 ............................................. G01D 5/34
[52] U.S. Cl. ................... 250/231 SE; 318/640
[58] Field of Search ............. 250/231 SE, 237 G; 318/640

[56] References Cited

U.S. PATENT DOCUMENTS

| 4,184,107 | 1/1980 | Turini et al. | 318/640 |
| 4,514,674 | 4/1985 | Hollis, Jr. et al. | 318/640 |
| 4,684,857 | 8/1987 | Llopis | 250/231 SE |

Primary Examiner—David C. Nelms
Assistant Examiner—Khaled Shami
Attorney, Agent, or Firm—Birch, Stewart, Kolasch & Birch

[57] ABSTRACT

An extra magnetic field positioning apparatus includes a motor which does not have stable points for defining the extra magnetic field. An encoder is provided which is rotated with the motor and individually has the information which indicates rotating displacement and the information which indicates rotating position. Further, a sensor detects the information indicating the rotating position recorded on the encoder, and another sensor detects the information indicating the rotating displacement recorded on the encoder.

3 Claims, 2 Drawing Sheets

EXTRA MAGNETIC FIELD POSITIONING APPARATUS

BACKGROUND OF THE INVENTION

The present invention relates to an extra magnetic field positioning apparatus in an optical magnetic disk apparatus.

A stepping motor, having several stable points in the motor itself, has sometimes been used as a drive motor for an extra magnetic field positioning apparatus in an optical magnetic disk apparatus.

However, since the dumping factor of the stepping motor used for driving is bad in the extra magnetic field positioning apparatus of the optical magnetic disk apparatus of the prior art, a longer setting time is required for positioning. Moreover positioning accuracy is lowered by fluctuation in the magnetic field of said stepping motor at the respective stable points for the positioning. Further, there has been a problem that it is very difficult to stop the stepping motor at the desired angle between said stable points, because said stable points of the stepping motor are set with equal intervals.

SUMMARY OF THE INVENTION

It is therefore an object of the present invention to provide an extra magnetic field positioning apparatus which has simplified structure, assures high speed operation with high accuracy, and eliminates positioning error by employing, for example, a DC motor having no particular stable points as a driving source.

In view of attaining the above object, the extra magnetic field positioning apparatus, in the optical magnetic disk apparatus of the present invention, is characterized in comprising: a motor having no stable points for defining the extra magnetic field; an encoder which is rotated together with said motor and individually has the information to indicate both the rotating displacement and the rotating position; a sensor to detect the information indicating the rotating position; and a sensor to detect information indicating the rotating position recorded on said encoder.

When the motor, having no stable points, is rotated as the driving source of extra magnetic field positioning apparatus, in order to change extra magnetic field, the encoder coupled to said motor rotates. The information indicating the rotating position, sent from the rotating encoder, is detected by the sensor. Simultaneously, the information indicating the rotating displacement sent from said rotating encoder, which is individually recorded, is also detected by the sensor. Thereby, these pieces of information are input, for example, to the feedback circuit and thus the extra magnetic field can be positioned at a high speed with high accuracy.

As is obvious from the above explanation, the extra magnetic field positioning apparatus of the present invention comprises an encoder. The encoder is rotated with the motor and individually has the information to indicate both the rotating displacement and rotating position. It also comprises a sensor to detect the information indicating the rotating position of said encoder and a sensor to detect the information indicating the rotating displacement of said encoder. It thereby realizes very easy positioning at high speed with high accuracy and at the desired position.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

The present invention will now be explained in detail in accordance with the preferred embodiment of the present invention.

Figure 1:
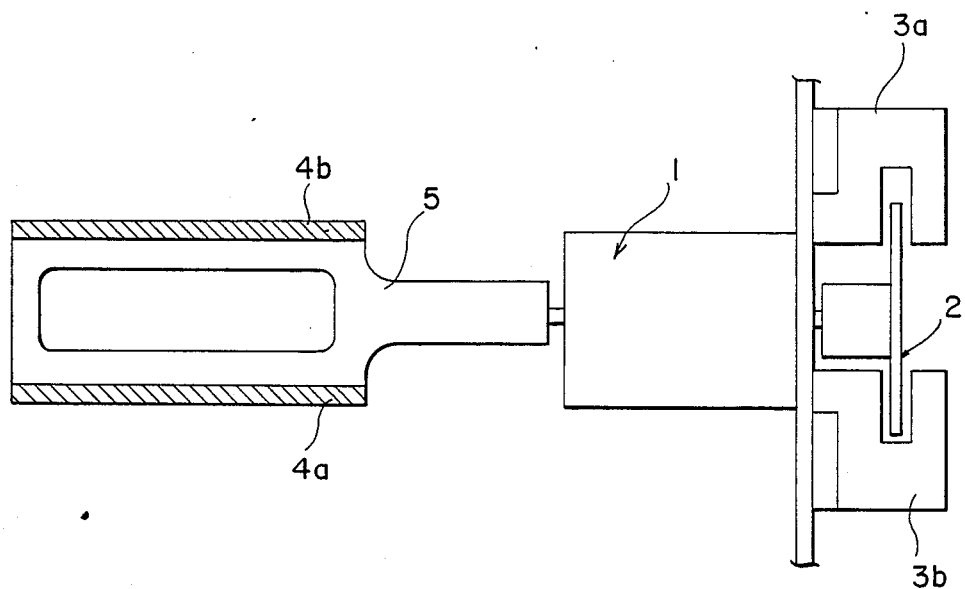
FIG. 1 is outline of structure of an extra positioning apparatus in the optical magnetic disk apparatus of the present invention.

In FIG. 1, 1 is a drive motor of extra magnetic field positioning apparatus of optical magnetic disk; 2 is an encoder which is fixed to the rotating shaft of said drive motor and rotates; and 3a, 3b are photosensors. Positioning of said drive motor 1 can be accomplished by feeding the displacement information of said drive motor, obtained from said encoder 2 and photosensors 3a, 3b, back to the motor 1. Here, said drive motor 1, a DC motor which does not have the stable points, is used. 4a, 4b are permanent magnets having reverse polarities. These two sheets of permanent magnets 4a, 4b are respectively arranged in the reverse sides of the rotating shaft of a holder 5 in such a way that they have reverse polarities owing to the holding member. The rotating shaft of holder 5, providing said permanent magnets 4a, 4b is fixed to the shaft of said drive motor 1. When said motor 1 rotates 180°, the permanent magnets 4a, 4b, having reverse poralities, can be located inversely, thereby changing the polarities of the extra magnetic field.

Figure 2:
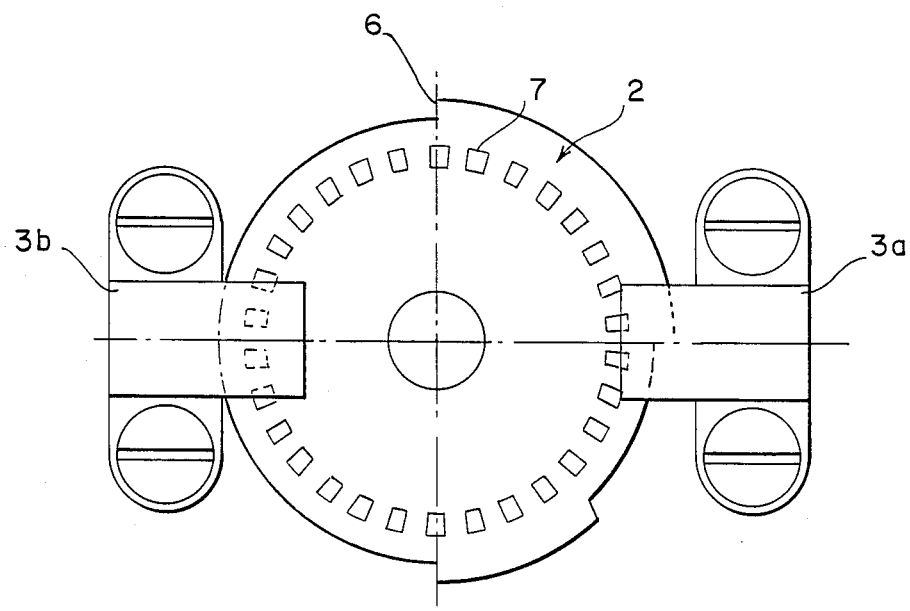
FIG. 2 indicates the positional relationship between the encoder and photosensor.

FIG. 2 is a detail view indicating the positional relationship of said encoder 2 and photosensors 3a, 3b. Said photosensors 3a, 3b are respectively projected on the rotation center of encoder 2 at both sides of the disk of rotating encoder 2 (FIG. 1). The light emitting part provided at one side of the projected part of the encoders, emit light toward the corresponding part of encoder 2. This light is received by the light receiving parts, provided at the other side. Thereby, the information of said encoder 2 is detected. the information recorded to the encoder 2, for said photosensors 3a, 3b, is composed of the stepped part 6 at the external circumference of encoder 2. Which indicates the rotating displacement of said DC motor 1 for the photosensor 3a. The window portions 7, provided with equal interval on the circumference of encoder 2, indicate the rotating position of DC motor 1 for the photosensor 3b. These photosensors 3a, 3b are symmetrically provided around the center of encoder 2, in order to simultaneously detect the encoder 2.

The extra magnetic field positioning apparatus, in the structure described above, determines the stop position and rotating position of said DC motor 1. The stepped portion 6 at, the circumference of said encoder, is considered as the stable point when the DC motor 1 stops.

Figure 3:
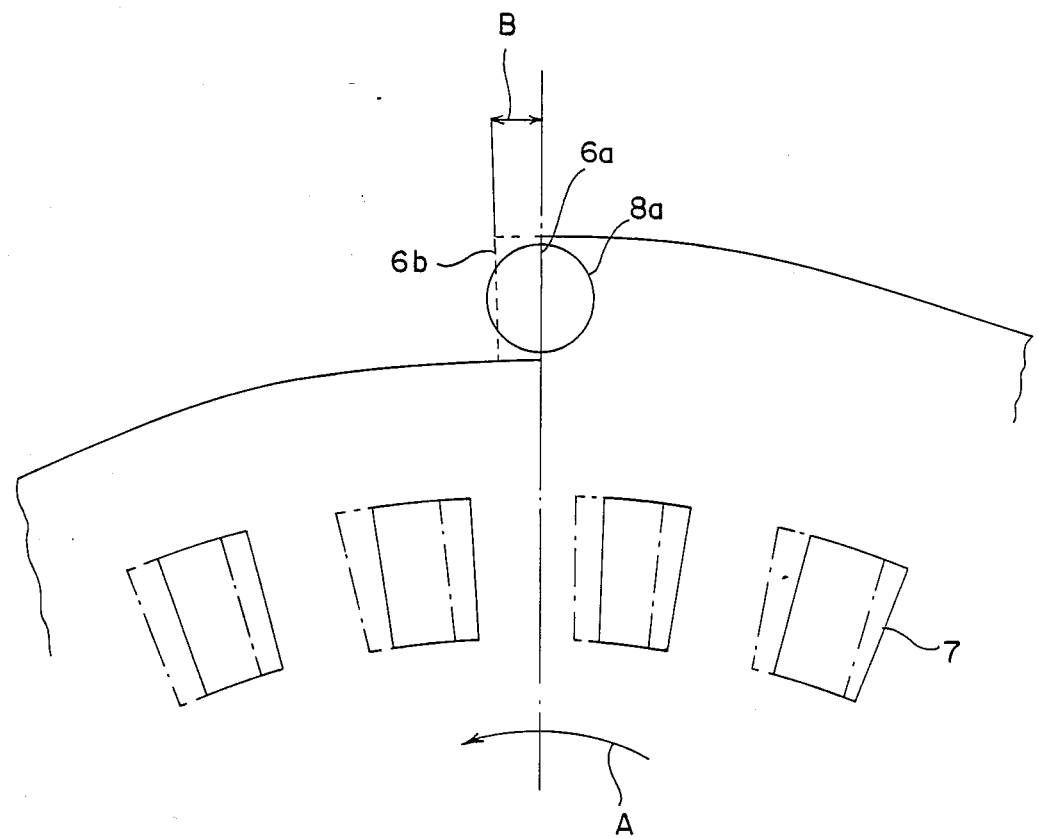
FIG. 3 is a detailed view of the essential part of said encoder.

The stop position can be determined as explained below. FIG. 3 indicates the detecting range 8a of the photosensor 3a for the stepped portion 6 at the external circumference of said encoder 2. In this Figure, when the stepped portion 6, at the external circumference of said encoder, enters the detecting range 8a of the photosensor 3a, the stop position of the DC motor 1 is determined. The encoder 2 thereafter, rotates slightly in the direction of an arrow mark A, with disturbance up to the condition indicated by the dotted line. The stepped portion 6a of the encoder 2 in the detecting range 8a of the photosensor 3a rotates only for the angle B and thus reach the position 6b. In this case, when the area closing said detecting range 8a increases, an output level of the photosensor 3a falls slightly from the initial position. Said DC motor 1 rotates in reverse, toward the direction of the arrow mark A, namely in such a direction so as to suppress fluctuation by said disturbance. The encoder 2 then returns to the initial condition 6a. If displacement in the reverse direction is generated by the disturbance, an output level of the photosensor 3a rises slightly from the initial position. The DC motor 1 then rotates in such a direction so as to suppress fluctuation by the disturbance, and returns to the initial condition 1. It then stops stably at the stop position.

As explained previously, the stable points can be provided to the DC motor 1 which does not intrinsically contain stable points. Thus the stable point absorbs the slight disturbance. Therefore, very accurate positioning can be realized. In addition, the DC motor 1 coupled to the encoder 1 can be stopped at the desired position only by changing the position of the stepped portion 6 of encoder 2. Simultaneously the servo pulling region can be widened and positioning error can be eliminated by limiting such stop points to only the required positions.

Next, the rotating position can be determined as explained below. For example, if it is requested to displace the position of said magnets 4a, 4b for 90°, it is enough that the stepped portion at the external circumference 6 of encoder 2 is rotated up to the position of said photosensor 3a in FIG. 2. However, when the DC motor 1 is rotated continuously, the encoder 2 also tries to rotate. The positioning operation is effectuated as explained above and thus the DC motor 1 can no longer be rotated. Therefore, in that case, the encoder moves from one stable point to the other stable point (namely, the stepped portion of external circumference of the encoder 2). The feedback circuit to the DC motor 1 from the encoder 2 is once cut and the DC motor 1 is rotated. When the encoder practically completes the rotation up to the target angle and said feedback circuit is closed at the adequate position (just before the stepped portion 6 of the external circumference of encoder 2 enters the detecting range 8a of said photosensor 3a), the positioning operation occurs again in such timing that the stepped portion 6 of external circumference enters the detecting range 8a. Thus, the encoder 2, namely the DC motor 1, stops at the target position.

In this case, the timing of closing said feedback circuit is determined as follows. That is, a number of window portions 7 having passed can be counted. The and the current position of the encoder 2 can always be detected by counting a number of ON signals generated when said window portions, provided with equal intervals in the circumferencial direction of the encoder 2, pass the photosensor 3b provided to detect them. Therefore, the timing for closing said feedback circuit can be achieved by counting a number of window portions 7, by means of the photosensor 3b during the period from start of rotation of the DC motor 1 until immediately before the stepped portion of external circumference 6 of said encoder enters the detecting range 8a. In this case, since the photosensors 3a and 3b are simmetrically located around the rotation center, the stepped portion 6 of the external circumference of encoder 2, which is the signal for the photosensor 3a, must be located symmetrical to the window portion 7 on the circumference, which is the signal for the photosensor 3b, in the same timing. Moreover, setting can be done quickly and thereby high speed rotation and high speed setting can also be realized while providing sufficient gain for said feedback operation.

While only certain embodiments of the present invention have been described, it will be apparent to those skilled in the art that various changes and modifications may be made therein without departing from the spirit and scope of the present invention as claimed.

What is claimed is:

1. An extra magnetic field positioning apparatus comprising:
    motor means which does not have stable points for defining the extra magnetic field;
    encoder means which is rotated with said motor means and individually encodes the information which indicates rotating displacement and information which indicates rotating position;
    sensor means which senses the information indicating the rotating position recorded on said encoder; and
    sensor means which senses the information indicating the rotating displacement recorded on said encoder means.

2. An extra magnetic field positioning apparatus according to claim 1, wherein a DC motor is used as the motor means which does not have said stable points.

3. An extra magnetic field positioning apparatus according to claim 2, wherein the sensor means which sense the rotating position and rotating displacement of said motor means are photosensors and are symmetrically located around the rotation center of the encoder means.

* * * * *